May 27, 1930.  H. A. HADLEY  1,759,900

SCALE

Filed Nov. 21, 1927

INVENTOR
Harlan A. Hadley
BY
Henry Sherman
ATTORNEY

Patented May 27, 1930

1,759,900

UNITED STATES PATENT OFFICE

HARLAN A. HADLEY, OF ST. JOHNSBURY, VERMONT, ASSIGNOR TO E. AND T. FAIRBANKS AND COMPANY, A CORPORATION OF VERMONT

SCALE

Application filed November 21, 1927. Serial No. 234,716.

This invention relates to improvements in scales of that type wherein a pointer is employed to indicate the movement of the beam of an equal-arm balance.

An important object of this invention is the provision in a scale of the character described of an indicator fulcrumed on a torsion ribbon, said indicator being normally yieldingly restrained to a predetermined path.

In a broad aspect, the present invention may be described as providing a means for floatingly mounting the indicator comprising a plurality of spaced elements in parallel planes, but at right angles to each other, one element pivotally interconnecting said indicator and beam and the other element adapted to act as a guide for the indicator whereby when the beam is actuated during a weighing operation the two elements co-act to impart to the indicator a pivotal movement. The advantages of this construction, among others, include the great multiplication possible and practical from the beam, or even-lever, to indicator and the simplicity and accessibility of structure.

Another object of the present invention is the provision of means for varying the multiplication from the even-lever to the indicator, the construction providing preferably an adjustable guide plate cooperating with a guide pin mounted on the indicator.

Still another object of this invention resides in the provision of a scale structure in which the parts will assume their zero or neutral position notwithstanding the fact that the base of the scale is not in a true horizontal plane.

Other objects of this invention, together with certain details of construction and combinations of parts, will be more particularly described by reference to the accompanying drawings and pointed out in the appended claims.

In the drawings.

Similar characters of reference indicate corresponding parts throughout the several views.

Figure 1:
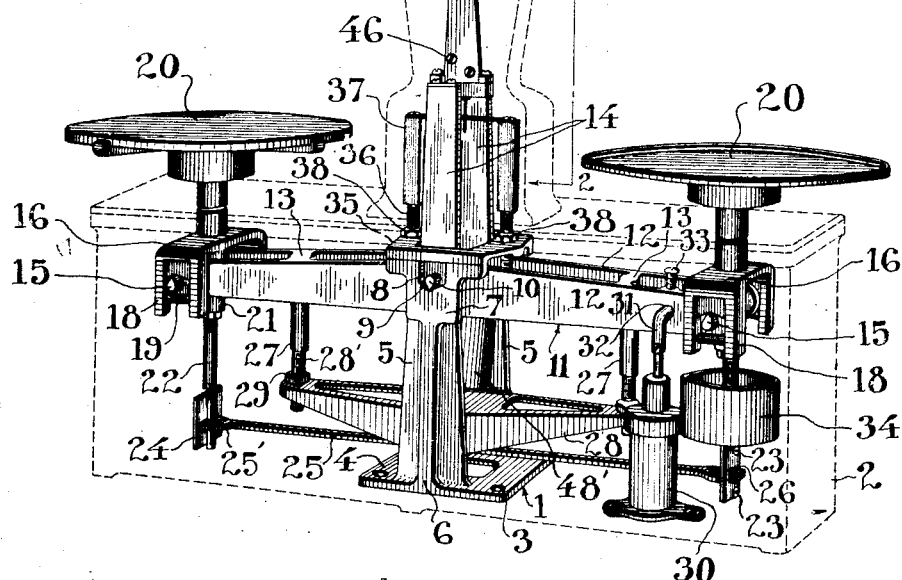
Figure 1 is a perspective elevational view of the scale with the housing thereof shown in broken lines.
Figures 2, 3:
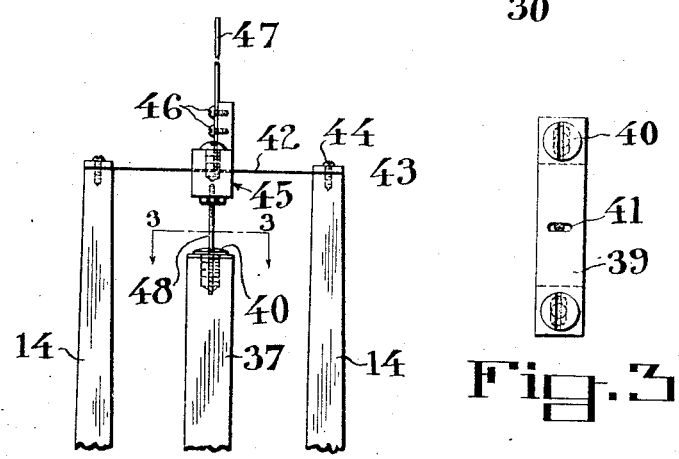
Figure 2 is side view of the scale taken on line 2—2 of Figure 1.
Figure 3 is a detail view of the guide plate taken on line 3—3 in Figure 2.

Referring to Figure 1 of the drawings, there is shown a scale, generally indicated by the reference character 1, which embodies my invention. The scale is mounted in a housing 2 and is fastened to the base thereof by any suitable means, as by screws (not shown) seated in screwholes 3 formed in the base plate 4 of the scale.

A pair of opposed standards, or uprights, 5 extend upwardly from the base plate and a reinforcing rib 6 extends vertically on each of the standards. The upper extremities of the standards are enlarged to form a boss 7. It is to be understood that the base plate, standards, ribs and bosses are integral parts of a single casting. In the bosses 7 are milled the openings 8, the lower portions of which are V-shaped to form bearing surfaces 9. These surfaces receive the knife edge pivots 10 mounted in an even-lever, or beam, 11, which is a casting having parallel side members 12 joined by cross-pieces 13. Rising from the central portion of each side member 12 of the even-lever 11 is an integral upright member 14, the purpose of which will be hereinafter set forth.

In the extremities of the side members 12 are set knife edge pivots 15 on which are pivotally carried the parallels 16. A V-grooved agate 17 is firmly cemented between each pair of fingers 18 of the parallels, the agates acting as bearing surfaces for knife edges 15, as is well understood in the art. Stop pins 19 are driven through suitable apertures in fingers 18 for the purpose of retaining the parallels on the knife edges.

Suitably mounted on the parallels are the commodity and weight pans 20. The parallels have integral therewith depending stems 21 on which are adjustably mounted the check-posts 22. These check-posts are formed with a reduced, flattened portion on the lower extremities thereof to which flattened portions are suitably attached, as by screws 23, the check-plates 24. A check-link 25 passes through an opening 26 in each check-plate and is retained in position by means of the lower extremity of the check-posts 22 which pass through an eye 25' formed in each extremity of the check-link 25.

In order to limit the vertical motion of the even-lever 11, the stop-posts 27 are mounted on a shelf 28. This shelf also forms an integral part of the base casting. The stop-posts are threaded, as at 28', for the purpose of allowing vertical adjustment and are adapted to be retained in adjusted position by means of lock nuts 29.

A dashpot 30 is suitably attached to the base of the scale housing and is adjustable with respect to the scale through the medium of a bent rod 31 which is slidably fitted in an opening 32 in a side member 12 of the even-lever. The bent rod is retained in adjusted position by means of a set screw 33. The dashpot performs the function of cushioning the movements of the even-lever 11. A receptacle 34, adapted to receive molten lead or lead shot, is attached to one of the check-posts 22 for the purpose of balancing the scale elements, as is well understood in the art.

A cap 35 is rigidly seated upon the upper extremities, or bosses, 7 of standards 5 closing the openings 8 therein. The cap has opposed screw-threaded apertures adapted for the reception of the reduced, screw-threaded extremities 36 of the posts 37. These posts are vertically adjustable and are retained in adjusted position by means of nuts 38. A guide plate 39 is suitably attached to posts 37, as by screws 40. The guide-plate has punched therein a laterally extending slot 41 substantially centrally thereof. The parallel sides of the slot are brought to a knife edge for a purpose hereinafter to be set forth.

Mounted between the upright members 14 is a torsion ribbon, or strip, 42 which is tightly strung between the uprights 14 and is clamped securely in position by means of clips 43 and screws 44. The longitudinal axis of the guide plate 39 is at right angles to the longitudinal axis of the torsion ribbon. An indicator mounting 45 is rigidly secured to this ribbon substantially centrally thereof and to this mounting is suitably attached, as by screws 46, the indicator 47.

Depending from the indicator mounting is a guide pin 48 which is adapted to extend through the slot 41 in the guide plate, said slot being just wide enough to allow the guide pin to move freely therein.

The construction outlined above provides a floating fulcrum for the indicator, the taut length of ribbon forming a pivotal connection between the indicator and the beam and a fulcrum for the indicator. During a weighing operation the torsion ribbon element co-acts with the guide plate through the medium of the indicator guide pin whereby the indicator is given a pivotal movement.

The multiplication from the beam to the indicator may be varied by raising or lowering the guide plate. As the distance between the torsion ribbon and the guide plate is shortened, the resistance offered by the torsion ribbon is increased, and, accordingly, the multiplication through the indicator becomes greater.

A balance weight 48' is attached to the even-lever substantially centrally thereof for the purpose of controlling the distribution of the metal above and below the pivot line of the lever. The construction is such that this distribution of metal may be varied.

It may be readily seen that when the housing of the scale is out of a true horizontal plane, the even-lever will plumb itself and the indicator will still point to the zero point on the chart 49, suitably held in the superstructure 50 of the housing.

Having thus described my invention, what I claim as new and desire to secure by Letters Patent of the United States, is:

1. In a device of the character described, a lever having a plurality of uprights integral therewith, a torsion ribbon attached to said uprights and an indicator fulcrumed on said ribbon.

2. In a device of the character described, the combination with a base having a lever pivoted thereon, of a torsion ribbon attached to said lever, said ribbon being normally substantially parallel to said base, and an indicator fulcrumed on said ribbon.

3. In a device of the character described, in combination, a base, a lever fulcrumed thereon, a torsion ribbon on said lever, an indicator fulcrumed on said ribbon and means co-acting with said ribbon whereby a pivotal movement of the indicator is effected.

4. In a device of the character described, in combination, a base, a lever fulcrumed thereon, a torsion ribbon on said lever, an indicator fulcrumed on said ribbon, and slotted means co-acting with said ribbon whereby a pivotal movement of the indicator is effected.

5. In a device of the character described, in combination, a base, a lever fulcrumed on said base, a torsion ribbon on said lever, an indicator fulcrumed on said ribbon and means whereby a pivotal movement of said indicator is effected, said means comprising a guide pin mounted on said indicator and a guide plate co-acting therewith.

6. In a device of the character described, in combination, a base, a lever fulcrumed thereon, a torsion ribbon on said lever, an indicator fulcrumed on said ribbon and means whereby a pivotal movement of said indicator is effected, said means comprising a guide pin mounted on said indicator and a guide plate having a slot therein, said guide pin extending through said slot.

7. In a device of the character described, in combination, a base having a shelf thereon, a lever fulcrumed on said base, a torsion ribbon on said lever, an indicator fulcrumed on said ribbon and means whereby a pivotal movement of said indicator is effected, said means comprising a guide pin depending from said indicator and a guide plate having a slot therein mounted on said shelf, said guide pin extending through said slot.

8. In a device of the character described, the combination with a scale beam and an indicator fulcrumed on said beam, of means for varying the multiplication from said beam to said indicator, comprising a vertically adjustable member.

9. In a device of the character described, the combination with a scale beam and an indicator resiliently mounted thereon, of means for varying the multiplication from said beam to said indicator, said means comprising an element movable relative to and co-operating with said indicator.

10. In a device of the character described, the combination with a scale beam and an indicator resiliently mounted thereon, of means for varying the multiplication from said beam to said indicator, said means comprising an adjustable plate adapted to co-operate with said indicator.

11. In a device of the character described, the combination with a scale beam and an indicator resiliently mounted thereon, of means for varying the multiplication from said beam to said indicator, said means comprising a vertically adjustable plate, having a slot therein, said plate adapted to co-operate with said indicator.

12. In a device of the character described, in combination, a base, a lever fulcrumed thereon, an indicator resiliently mounted on said lever, said indicator having a guide pin attached thereto, a guide plate adapted to co-act with said guide pin and means mounted on said base for holding said guide plate.

13. In a device of the character described, in combination, a base, a lever fulcrumed thereon, an indicator resiliently mounted on said lever, said indicator having a guide pin attached thereto, a guide plate adapted to co-act with said guide pin and vertically adjustable means on which said guide plate is mounted.

14. In a device of the character described, the combination with a base having a lever mounted thereon, a torsion ribbon carried by said lever and an indicator fulcrumed on said ribbon, of means on said base for varying the leverage exerted on said indicator.

15. In a device of the character described, the combination with a base having a lever mounted thereon, a torsion ribbon carried by said lever and an indicator fulcrumed on said ribbon, of means on said base for varying the leverage exerted on said indicator comprising a member movable relative to said torsion ribbon.

16. In a device of the character described, the combination with a base having a lever mounted thereon, a torsion ribbon carried by said lever and an indicator fulcrumed on said ribbon, of means on said base for varying the leverage exerted on said indicator comprising a vertical adjustable guide plate.

In testimony whereof I hereunto affix my signature this 19th day of November, 1927.

HARLAN A. HADLEY.